United States Patent

Baldwin et al.

[11] Patent Number: 6,104,909
[45] Date of Patent: *Aug. 15, 2000

[54] METHOD AND APPARATUS FOR REPORTING STATUS INFORMATION IN A FIXED WIRELESS TERMINAL

[75] Inventors: Curtis Keith Baldwin; Zachry Shay Collins, both of Bedford; Phillip Anthony Garcia, Keller; Douglas Hoersch Salvon, Bedford, all of Tex.

[73] Assignee: Motorola, Inc., Schaumburg, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/902,136

[22] Filed: Jul. 30, 1997

[51] Int. Cl.$^7$ .............................. H04B 7/26; H04B 17/00
[52] U.S. Cl. ........................... 455/5.1; 455/424; 455/425; 455/67.7; 455/566
[58] Field of Search .......................... 455/415, 422–425, 455/401, 403, 462, 463, 466, 561, 566, 27.4, 67.7, 563, 574, 552, 67.1, 115, 69, 522, 226.1, 501; 379/142, 201

[56] References Cited

U.S. PATENT DOCUMENTS

| | | | |
|---|---|---|---|
| 5,526,403 | 6/1996 | Tam | 455/552 |
| 5,526,406 | 6/1996 | Luneau | 455/563 |
| 5,544,223 | 8/1996 | Robbins et al. | 455/426 |
| 5,581,599 | 12/1996 | Tsuji et al. | 455/574 |
| 5,603,095 | 2/1997 | Uola | 455/67.7 |
| 5,615,257 | 3/1997 | Pezzullo et al. | 379/201 |
| 5,646,979 | 7/1997 | Knuth | 455/563 |
| 5,781,856 | 7/1998 | Jacobs et al. | 455/403 |
| 5,799,254 | 8/1998 | Karmi et al. | 455/401 |
| 5,802,148 | 9/1998 | Sizer, II | 379/142 |
| 5,842,114 | 11/1998 | Ozluturk | 455/69 |
| 5,878,209 | 3/1999 | Manssen | 455/425 |
| 5,889,837 | 3/1999 | Sands | 455/425 |
| 5,898,921 | 4/1999 | Liinamaa et al. | 455/425 |
| 5,905,963 | 5/1999 | Lysejko | 455/425 |

*Primary Examiner*—Reinhard J. Eisenzopf
*Assistant Examiner*—Lester G Kincaid
*Attorney, Agent, or Firm*—L. Bruce Terry; Mario J. Donato, Jr.

[57] ABSTRACT

In a fixed wireless terminal (200), a transceiver (210) is coupled to a call processor (208), wherein the call processor (208) includes status information (218). A telephone line coupling (202) is coupled to the call processor (208). A status processor (212) is coupled to the call processor (208) for reading the status information (218). A signaling generator (206) is coupled to the status processor (208) and the telephone line coupling (202) for providing signals that represent the status information (218). Such status information (218) includes operating conditions and test results in the fixed wireless terminal. Such signals include caller ID-type signals and other audio signals. Caller ID signals may be displayed on a caller ID module (222) or a caller ID equipped telephone. A request for status information (218) may be entered at a telephone (220) connected to the fixed wireless terminal (200).

28 Claims, 2 Drawing Sheets

6,104,909

METHOD AND APPARATUS FOR REPORTING STATUS INFORMATION IN A FIXED WIRELESS TERMINAL

FIELD OF THE INVENTION

This invention is related in general to wireless communications systems, and more particularly to an improved method and system for displaying or reporting status information from a fixed wireless terminal operating in a wireless local loop.

BACKGROUND OF THE INVENTION

Many cellular telephones used in a wireless telephone system include a visual interface which displays status information to the user, such as the unit's ability to access a local cell site. Other status information about the cellular telephone itself may also be reported to the user via a visual interface and display on the cellular telephone. However, the use of an ordinary wireline telephone connected to a fixed wireless terminal (FWT) in a wireless local loop (WLL) lacks such a visual display capability, but could also benefit from the status information that is available in the wireless local loop system.

In a wireless local loop system, the fixed wireless terminal may be mounted in a building or residence in a location that is not easily accessible for obtaining status information of the FWT. Such status information may include idle or on-hook conditions, service status (e.g., no service, in service), received signal strength, battery charge, or other general faults which may affect service. This status information is important to both the user and the fixed wireless terminal installer or troubleshooter, but is not accessible with an ordinary telephone connected to the FWT. The lack of such status information can lead to wasted time and frustration due to repeated unsuccessful attempts to place a call when unknown radio frequency (RF) or cellular system problems exist. Moreover, during a conversation over the FWT, when the wireline telephone is off hook, the aforementioned status information, as well as other information important to the user concerning hand-off or call duration, is likewise inaccessible from the wireline telephone.

The general lack of a visual interface capability in a wireline telephone used in a WLL may make it difficult to retrieve diagnostic or test information from the fixed wireless terminal or WLL system during testing, installation, or servicing of the equipment. To some extent this deficiency can be overcome with special test fixtures or computing equipment that connects directly to the fixed wireless terminal through a test interface, wherein test signals or prompts are sent to the fixed wireless terminal and responses are observed on a readout. However, this direct connection approach is especially inconvenient if the fixed wireless terminal is remotely located or installed in an inaccessible place such as the side of a building or in an attic.

In view of the foregoing it is apparent that a need exists for an improved method and apparatus for monitoring status information and operation of a fixed wireless terminal in a WLL from a convenient location without requiring direct connection test fixtures, cumbersome diagnostic equipment, or other expensive apparatus.

SUMMARY OF THE INVENTION

The foregoing problems are solved and a technical advance is achieved with the use of an audio signaling generator, or a generic, asynchronous voice band protocol (caller ID protocol) signaling generator, in novel combination with status processing means in a fixed wireless terminal connected to a user's telephone to retrieve, format, generate, and display status information to the user on conventional caller ID equipment connected to the user's telephone line.

In basic operation, a fixed wireless terminal having transceiver and call processing means establishes a wireless local loop by the connection of an ordinary wireline telephone to the FWT. This provides the user with an RF telephone link to a cellular telephone system for transmission of voice or data communications. In a preferred embodiment, a standard caller ID module, either in the telephone or in line between the fixed wireless terminal and the telephone, conveniently and inexpensively provides the means to provide status or test information to the user. Such status information may be obtained from a status processor within the fixed wireless terminal on request in response to a user who enters a simple sequence of dialed characters on the telephone. The requested status information is reported over the same telephone line on which the request was initiated. A telephone line coupling or interface and the call processor within the fixed wireless terminal are used to decode the dialing signals to enable access to the status processor in the FWT. Upon gaining access to the FWT, the status processor may provide helpful prompts on the caller ID display as to the particular status information available, and the dialing sequence required to retrieve the status information. The desired status information is then reported on the display or by tones generated in the earpiece of the telephone. A signaling generator within the telephone line interface of the fixed wireless terminal encodes the information provided by the status processor into an FSK or DTMF signal according to the generic, asynchronous caller ID protocol, or, alternatively, the signaling generator may generate audible tones for signaling through the telephone earpiece or control signals to produce a sequence of ringing signals on the telephone ringer.

In an alternate embodiment, a fixed wireless terminal having transceiver and call processing means, and further having status processing, signaling generator, and telephone line interface means, also includes the caller ID interface, decoding, and display means. This embodiment requires no other apparatus besides coupling an ordinary wireline telephone to the fixed wireless terminal via a telephone line. Upon dialing a request using the telephone, the fixed wireless terminal may provide status information to be read out on the caller ID display built into the FWT. Alternatively, the status or test information may be provided via audible signals transmitted to the telephone to report the results of the test or indicate status.

In another embodiment, a wireless local loop system, having, in combination, a fixed wireless terminal and a caller ID module coupled together via a local loop, is responsive to dialing commands present on the local loop, such as those which may be provided from a telephone. A signaling generator within the fixed wireless terminal generates an output signal which may contain status information for display on the caller ID module or other indication through audible signals coupled to the telephone.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF THE INVENTION

In a preferred embodiment, the present invention utilizes caller ID protocol as specified in the following Bellcore documents. GR-30-CORE Voiceband Data Transmission Interface provides the requirements for generating FSK data signals. Document numbers TR-NWT-00031 and TR-NWT-001188 provide the requirements for implementing caller ID calling number and calling name respectively. The caller ID protocol provides a generic asynchronous voice band protocol usable for displaying status and/or test or diagnostic information about a connected fixed wireless terminal on caller ID equipment both before call origination and during an active call. Note that throughout this document, "status information" may refer to operating conditions and parameters set within the fixed wireless terminal as well as "results" of tests or diagnostic procedures, which results may be considered "status information" resulting from the test.

Figure 1:
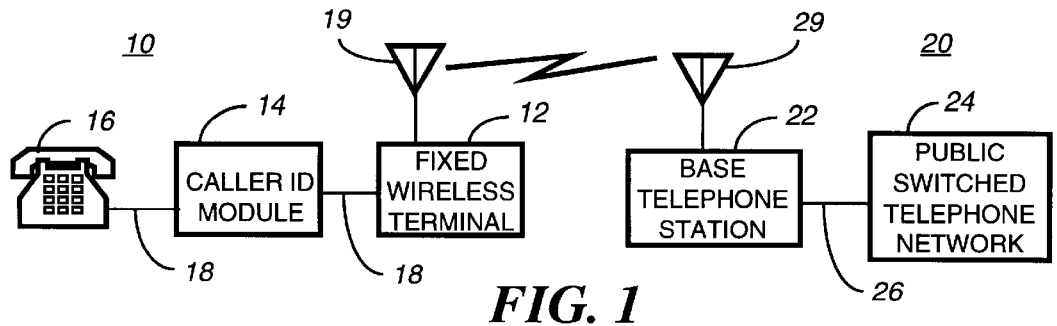
FIG. 1 shows a wireless local loop system communicating with the public switched telephone network via a wireless communication channel.

FIG. 1 illustrates a wireless local loop (WLL) system 10 communicating with the public switched telephone network (PSTN) 20 over a wireless communication channel. WLL 10 includes fixed wireless terminal (FWT) 12 connected to antenna 19 and telephone line 18. Also connected to telephone line 18 are caller ID module 14 and telephone 16. Connections to telephone line 18 may be made using standard connectors (not shown) such as those known by the designation RJ-11, and the like. Caller ID module 14 is a typical unit available to consumers and is equipped with a display for displaying calling number and perhaps calling name information, or other similarly encoded information.

Base Telephone Station (BTS) 22, with its associated antenna 29, is shown coupled to PSTN 24 via signal path 26 to illustrate the environment in which WLL 10 operates. These units, BTS 22, antenna 29, signal path 26 and PSTN 24, are well known in the art and will not be described further herein. Similarly, other standard units in FIG. 1, such as telephone 16, caller ID module 14, telephone line 18, and antenna 19, are standard, well-known items, which will not be described further.

In the preferred embodiment, a data transmission path to caller ID module 14 may be established over telephone line 18 when fixed wireless terminal 12 is in an idle state prior to call origination and telephone 16 is on-hook. Useful status information may thus be displayed on caller ID module 14 before a call is originated. By way of example, the following kinds of status information may be displayed: service status, i.e., no-service or in-service; received signal strength indication (RSSI); low-battery indication; system test results; or any other general faults or performance information.

Similarly, WLL system 10 of FIG. 1 may be used to establish a data transmission path to caller ID module 14 during a call, while fixed wireless terminal 12 is in a conversation state, and telephone 16 is off-hook. Illustratively, the kinds of conversation-state, status information which may be displayed include: service status, handoff information, call duration, low battery, or other general faults or performance information.

In another mode of operation, the features of WLL system 10 may be used during maintenance, service, or repair operations to extract test data or diagnostic or monitoring indications from fixed wireless terminal 12. This status information may be obtained by entering a coded dialing sequence on the key pad or rotary dial of telephone 16, followed by display of the requested status information or further instruction prompts on caller ID module 14. Examples of status information related to tests and diagnostic procedures may include, but is not limited to: results of diagnostic routines, location of a fault, accumulated values in monitoring registers, and the like. Status information may also be reported with other output indications in the form of tone or speech signals generated in fixed wireless terminal 12 and reproduced in the earpiece of telephone 16. Other output signals in the form of ringing signals may also be generated in fixed wireless terminal and coupled to telephone 16 to report status information.

Figure 2:
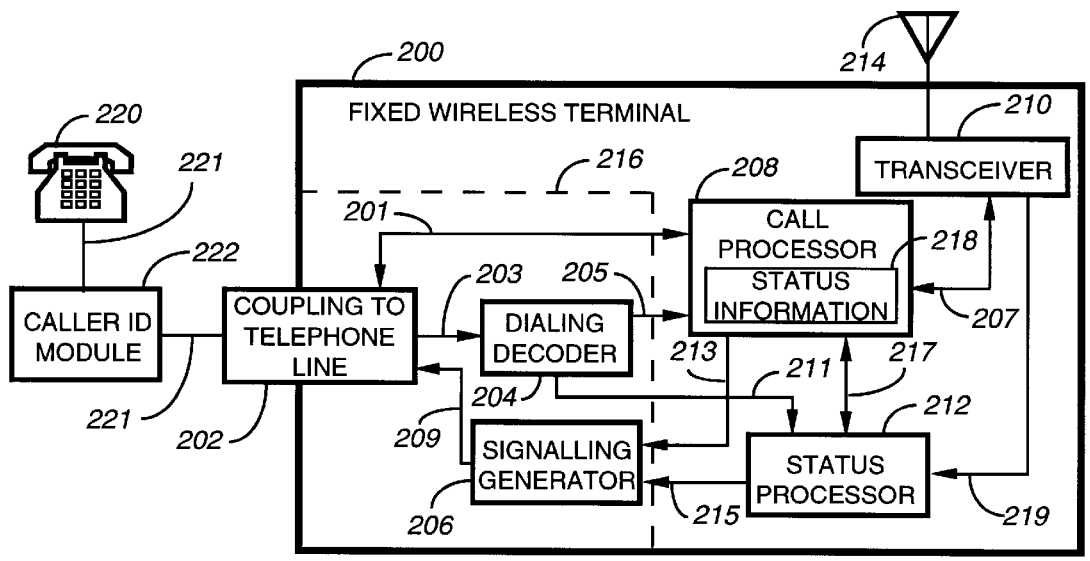
FIG. 2 shows a functional block diagram of a wireless local loop system in accordance with the present invention.

FIG. 2 shows a functional block diagram of a WLL system embodying the present invention. As illustrated, fixed wireless terminal 200 is coupled to an RF communications channel (not shown) by antenna 214, and to telephone line 221 by coupling 202. Coupling 202, which may serve the dual purpose of providing a local loop interface and a status information signaling port, may illustratively be an RJ-11 connector and a local loop electrical circuit. Similarly, telephone line 221 may be coupled to caller ID module 222 and to telephone 220 using standard telephone line cabling and connectors (connectors not shown), such as the aforementioned RJ-11 type connector. Antenna 214, coupling 202, and the other connectors are well known in the art and will not be further described.

In fixed wireless terminal 200 shown in FIG. 2, transceiver 210 and call processor 208, coupled via path 207, are well known elements of wireless cellular telephones. The functions of call processor 280 include establishing and maintaining communication with base telephone station (BTS) 22, initiating and terminating a call, encoding and decoding voice and data, conforming to the selected multiple access protocol, and other similar functions typically performed in a subscriber unit in a cellular communications system. As there are several types of wireless telephone technologies in current use, these will not be described further because such details are well known to persons skilled in the art. By way of example, the present invention may be implemented in a CDMA (Code Division Multiple Access) fixed wireless terminal. However the invention not is not limited to any particular form of multiple access or spectrum utilization technology.

As shown, call processor 208 includes status information 218. Such status information may be stored in memory or registers or other storage devices, and may include operating conditions and parameters, monitored parameters, test results, or the like.

Returning to FIG. 2, the signals conducted along path 207 may accordingly include voice or data signals, control signals, and the like. Voice path 201 illustrates the bidirectional coupling of the voice, data, and control signals between the call processor 208 and coupling 202.

Also connected between coupling 202 and call processor 208 is dialing decoder 204 for detecting and decoding dual-tone-multi-frequency (DTMF) or pulse dialing signals received by fixed wireless terminal 200 on telephone line 221. Dialing signals are coupled to dialing decoder 204 along path 203 and decoded dialing data is coupled to call processor 208 along path 205. In some embodiments dialing decoder 204 may be implemented as part of call processor 208, especially if call processor 208 is largely implemented in software on a digital signal processor.

Call processor 208 is further coupled to telephone line 221 via data signal path 213, signaling generator 206, output signal path 209, and coupling 202. Data sent by call processor 208 or status processor 212, to be described later, are encoded for modulation in signaling generator 206 and provided as output signals for display or other reporting on telephone line 221.

Proceeding further with the description of FIG. 2, status processor 212 is shown coupling transceiver 210 to data encoder 206 along signal path 219 and signal path 215. Status processor 212 also interacts with call processor 208 along bidirectional signal path 217.

Finally, dialing decoder 204 is also coupled to status processor 212 via signal path 211. Status processor 212 performs a number of functions under the control of call processor 208. These functions include, but are not limited to, monitoring and storing certain call processing parameters utilized during set up, reception and transmission of communication with another station. Other parameters attendant to the reliable operation of fixed wireless terminal 200 itself may be monitored during operation and stored for reporting upon request.

As mentioned previously, diagnostic test routines may be initiated upon request during certain operating conditions or during maintenance, service, or repair. Any of such status information or test data may be retrieved and formatted in status processor 212 for delivery to signaling generator 206. In the present invention, for example, status processor 212 responds to certain dialing signals input from dialing decoder 204 to produce additional status information and/or test data. This status information may be encoded by signaling generator 206 as caller ID signals for coupling to caller ID display apparatus, or as signals to produce an audible response in telephone 220. It should be understood from the above description that coupling 202, dialing decoder 204, signaling generator 206 and their associated signal paths together function as telephone line interface 216, shown to the left and below the dashed line within fixed wireless terminal 200 in FIG. 2.

Figure 3:
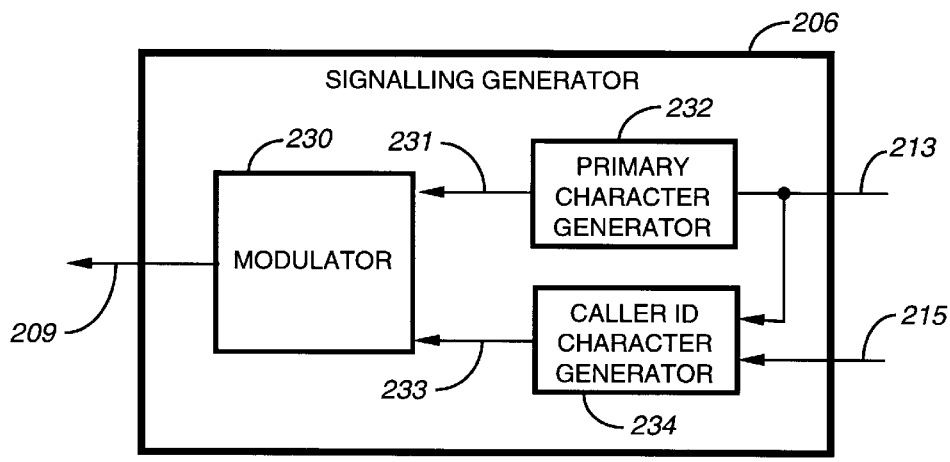
FIG. 3 shows a functional block diagram of the signaling generator portion of the fixed wireless terminal of FIG. 2.

With reference now to FIG. 3, there is depicted one implementation of signaling generator 206 as it may be used in the present invention. In general, signaling generator 206 has character or tone generation and modulation functions, depending on the particular fixed wireless terminal 200 chosen for use with the present invention. In some embodiments several character or tone generator blocks may be required. For example, in FIG. 3, signaling generator 206 includes caller ID character generator 234 and modulator 230, in addition to primary character generator 232. Signal paths 213, 215, 231, 233 and 209 are shown interconnecting the functional blocks as shown in FIG. 3. Primary character generator 232 may illustratively include an ASCII character generator, a signaling tone generator, a universal asynchronous receiver/transmitter (UART) or other device for changing the form of digital data for modulation and coupling to the telephone line 221 of FIG. 2. Primary character generator 232 may also generate ringing signals. The foregoing embodiments described for FIG. 3 are provided for illustration and should not be understood as limiting alternative implementations as will be apparent to those skilled in the art.

It is important to recognize that the present invention contemplates signaling or reporting of status information or test results as out-of-band data, such as display characters or symbols, or as in-band-signals, such as audible tones or ringing signals and the like. Either or both implementations may be provided in the same implementation. Further, the invention contemplates use of the same telephone line or port for both initiation of a request for status information and for reporting, indicating or displaying such status information.

Figure 4:
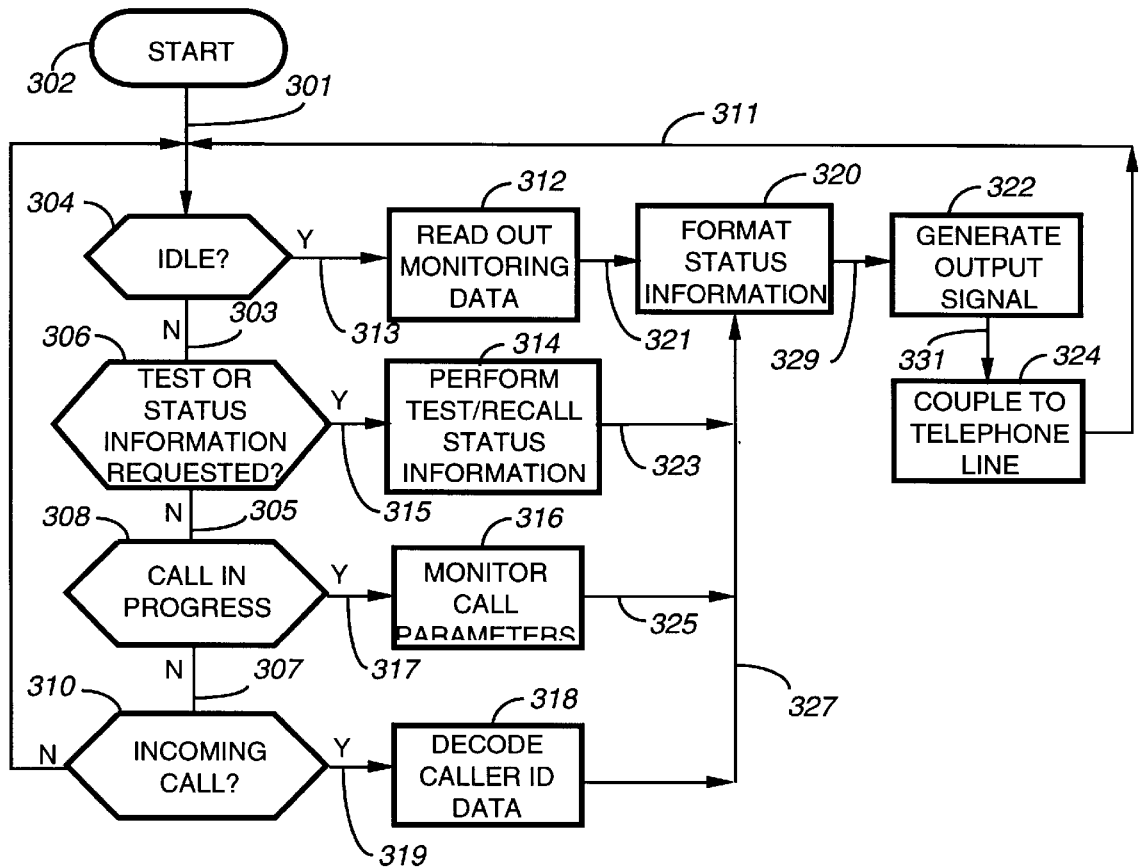
FIG. 4 shows a functional flow diagram of a fixed wireless terminal system operating according to the present invention.

FIG. 4, which shows a functional flow diagram of a WLL system operating according to the present invention, will next be described in conjunction with the apparatus illustrated in FIGS. 2 and 3. After entering the process flow at block 302, flow proceeds through decision blocks 304, 306, 308 and 310 to determine an operating state of the FWT. Such operating states may be designated as: Idle 304, Test Requested 306, Call In Progress 308, and Incoming Call 310. When any of these operating states is affirmatively identified as designated by a "Y" next to the decision block, the flow of operation proceeds to a processing function, followed by a formatting step to format the status information resulting from the processing step. Subsequently, an output signal is generated, coupled to the telephone line, and the process returns to the beginning of the operating state sequence at block 304.

If the fixed wireless terminal is in an idle condition, as illustrated at block 304, selected status information may be displayed or reported. Such selected status information may be continuously monitored and read out, as depicted at block 312. Such status information may include system parameters such as service status (e.g., in or out of service), low battery, RSSI, or other general fault or condition indicators which may be monitored on-hook The monitored status information is then formatted, as shown at block 320, for reporting via coupling 202. Next, an output signal is generated at block 322 and such output signal is coupled to the telephone line, as illustrated at block 324. The same general process flow is used for reporting or indicating test results on the telephone line via other signals such as synthesized speech, audible tones, ringing signals and the like.

In formatting process step 320, status information is parsed and then formatted for display as a caller ID signal or reporting via audible signals. In process step 322 caller ID character generator 234 within signaling generator 206 in FIG. 3 generates an output signal by encoding and modulating the formatted status information into character data or display data, or audible reporting signals, for transmission along telephone line 221, as shown in FIG. 2. The output signal is coupled to telephone line 221 in process step 324 (FIG. 4) by the coupling to telephone line 202 (FIG. 2).

If the fixed wireless terminal is responding to entry of a Test Request, as determined in block 306 of FIG. 4 the status processor 212 initiates the requested test and causes the display of the data requested. Such test requests may be entered by a user or service person using telephone 220 and may include any of a wide variety of diagnostic tests as described previously. To initiate a test or request status information, a request may be entered in the fixed wireless terminal by dialing a special sequence of digits on telephone 220. Read out or recalling information to be displayed again proceeds as described above.

If the fixed wireless terminal is in a Call-In-Progress operating state 308, the fixed wireless terminal may monitor certain call parameters while the telephone is off-hook, wherein the status processor 212 responds by performing the monitoring and read out as described above.

If the fixed wireless terminal is receiving an Incoming Call, as determined at block 310, the normal caller ID function is activated and carried out accordingly in process steps 318, 320, 322 and 324 in the same way as discussed previously.

In operation, the present invention may further provide special signaling utilizing the caller ID protocol to communicate the status and test information resulting from both routine and special monitoring or diagnostic sequences. In particular such special signaling may include that occurring during the Open Switch Interval which precedes on-hook transmission and the Customer Premises Equipment Alerting Signal (CAS) that is required before off-hook transmission. Other features of the invention illustratively include implementation of password entry or of a test command parser via DTMF or pulse digit detection and decoding, calling the proper test commands and sending the results via either out-of-band data signaling or in-band audible signals over the telephone line coupled to the FWT. It is also contemplated that status or test information may be requested, for example, by call processor 208 as part of a step in an operating sequence of the FWT, which request is not specifically initiated by a user as described previously.

The foregoing description of a preferred embodiment of the invention has been presented for the purpose of illustration and description. It is not intended to be exhaustive or to limit the invention to the precise form disclosed. Modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A fixed wireless terminal comprising:
   a transceiver;
   a call processor coupled to the transceiver, wherein the call processor includes status information that is independent from messages received by the transceiver;
   a telephone line coupling coupled to the call processor;
   a status processor coupled to the call processor; and
   a signaling generator coupled to the status processor and the telephone line coupling for reporting the status information on a device connected to the telephone line coupling.

2. The fixed wireless terminal of claim 1 wherein the signaling generator is a caller identification signaling generator.

3. The fixed wireless terminal of claim 1 wherein the signaling generator further includes an audio signal generator.

4. The fixed wireless terminal of claim 3 wherein the audio signal generator further includes a speech synthesizer.

5. The fixed wireless terminal of claim 1 wherein the signaling generator further includes a telephone ringer signal generator.

6. The fixed wireless terminal of claim 1 wherein the status information that is independent from messages received by the transceiver further includes information indicating operating conditions in the fixed wireless terminal.

7. The fixed wireless terminal of claim 1 wherein the status information that is independent from messages received by the transceiver further includes information indicating results of tests involving the fixed wireless terminal.

8. The fixed wireless terminal of claim 1 wherein the telephone line coupling further includes an RJ-11 type connector and a local loop electrical interface.

9. A method for reporting status information from a fixed wireless terminal, wherein the status information is independent from messages received by the transceiver and the fixed wireless terminal has a telephone line coupling, the method comprising the steps of:
   reading the status information;
   generating a status information output signal; and
   coupling the status information output signal to the telephone line coupling for reporting the status information on a device connected to the telephone line coupling.

10. The method of claim 9 wherein the step of reading the status information further includes the step of reading the status information in response to a request for status information received via the telephone line coupling.

11. The method of claim 10 wherein the request for status information received via the telephone line coupling further includes a sequence of dual-tone multifrequency signals.

12. The method of claim 9 wherein the step of generating a status information output signal further includes generating a status information output signal having a caller identification-type format for display on a caller ID unit.

13. The method of claim 9 wherein the step of generating a status information output signal further includes generating a status information output signal that can be heard using a telephone coupled to the telephone line coupling.

14. The method of claim 13 wherein the step of generating a status information output signal that can be heard using a telephone coupled to the telephone line coupling further includes generating coded sequences of audio tones.

15. The method of claim 13 wherein the step of generating a status information output signal that can be heard using a telephone coupled to the telephone line coupling further includes generating coded sequences of ringer signals.

16. The method of claim 13 wherein the step of generating a status information output signal that can be heard using a telephone coupled to the telephone line coupling further includes generating synthesized voice signals.

17. The method of claim 9 wherein the step of generating a status information output signal further includes generating a status information output signal that represents operating conditions in the fixed wireless terminal.

18. The method of claim 9 wherein the step of generating a status information output signal further includes generating a status information output signal that represents a result of a test of the fixed wireless terminal.

19. A system for reporting status information from a fixed wireless terminal, wherein the status information is independent from messages received by the transceiver and the fixed wireless terminal has a telephone line coupling, which comprises:
   means for reading the status information;
   means for generating a status information output signal; and means for coupling the status information output signal to the telephone line coupling for reporting the status information on a device connected to the telephone line coupling.

20. The system of claim 19 wherein the means for reading the status information further includes means for reading the status information in response to a request for status information received via the telephone line coupling.

21. The system of claim 20 wherein the request for status information received via the telephone line coupling further includes a sequence of dual-tone multifrequency signals.

22. The system of claim 19 wherein the means for generating a status information output signal further includes means for generating a status information output signal having a caller identification-type format for display on a caller ID unit.

23. The system of claim 19 wherein the means for generating a status information output signal further includes means for generating a status information output signal that can be heard using a telephone coupled to the telephone line coupling.

24. The system of claim 23 wherein the means for generating a status information output signal that can be heard using a telephone coupled to the telephone line coupling further includes means for generating coded sequences of audio tones.

25. The system of claim 23 wherein the means for generating a status information output signal that can be heard using a telephone coupled to the telephone line coupling further includes means for generating coded sequences of ringer signals.

26. The system of claim 23 wherein the means for generating a status information output signal that can be heard using a telephone coupled to the telephone line coupling further includes means for generating synthesized voice signals.

27. The system of claim 19 wherein the means for generating a status information output signal further includes means for generating a status information output signal that represents operating conditions in the fixed wireless terminal.

28. The system of claim 19 wherein the means for generating a status information output signal further includes means for generating a status information output signal that represents a result of a test of the fixed wireless terminal.

* * * * *